A. A. NELSON.
CAR RAISING DEVICE.
APPLICATION FILED SEPT. 7, 1911.

1,020,217.

Patented Mar. 12, 1912.

Inventor
A. A. Nelson.

Witnesses

By

Attorneys

UNITED STATES PATENT OFFICE.

ALVA A. NELSON, OF NEEDLES, CALIFORNIA.

CAR-RAISING DEVICE.

1,020,217. Specification of Letters Patent. Patented Mar. 12, 1912.

Application filed September 7, 1911. Serial No. 648,072.

*To all whom it may concern:*

Be it known that I, ALVA A. NELSON, a citizen of the United States, residing at Needles, in the county of San Bernardino, State of California, have invented certain new and useful Improvements in Car-Raising Devices; and I do hereby declare the following to be a full, clear, and exact description of the invention, such as will enable others skilled in the art to which it appertains to make and use the same.

My invention relates to new and useful improvements in lifting devices, and more especially to that type of lifting devices adapted to be employed upon cars as a means for lifting the journal box in respect to the axle in order to assist in the removal or positioning of the bearing brass, and the object of my invention is to improve the construction and increase the efficiency of devices of the above described character.

With this and other objects in view, my invention will be more fully described, illustrated in the accompanying drawings which show a preferred embodiment of the device and then specifically pointed out in the claims which are attached to and form a part of this application.

Figure 1:
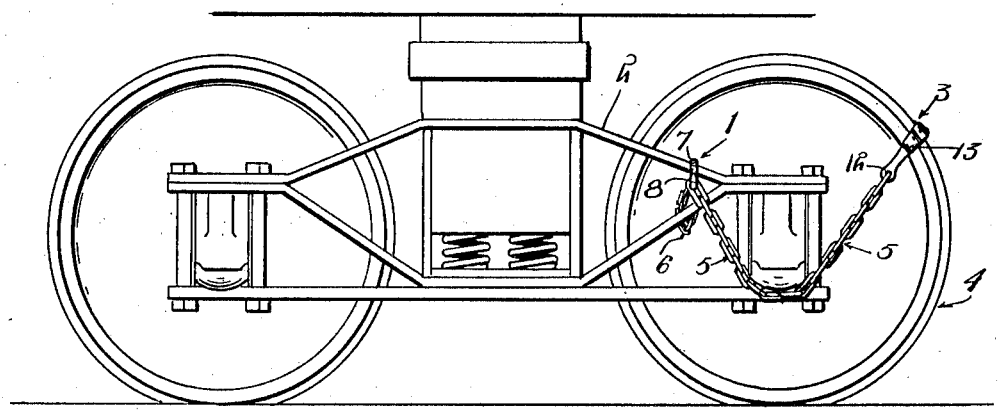
Figure 2:
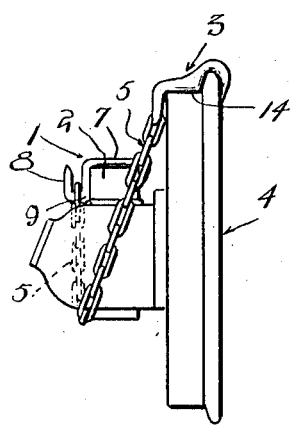
Figure 3:
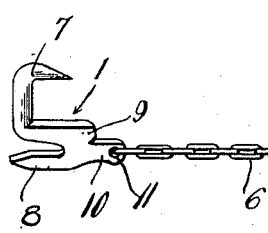
Figure 3:

In the accompanying drawings, Figure 1 is a side elevation of a car truck showing my device in operation. Fig. 2 is an end elevation thereof. Fig. 3 is a perspective of the device itself.

Referring more specifically to the drawings, in which similar reference numerals designate corresponding parts throughout, my invention will be seen to consist primarily of a hook 1 adapted to engage with the side frame 2 of the wheel truck, a second hook 3 adapted to engage with the tread of the car wheel 4, a heavy chain 5 connected by one end with the hook and adapted to be detachably secured to the hook 1, and a second and comparatively light chain 6 connected by one end to the free end of the chain 5 and by the other to the hook 1.

The hook 1 as shown, is a compound hook comprising two hooks 7 and 8 which, as shown are oppositely disposed and lie in the same plane, and the hook 7 is substantially U-shaped to engage over the top of the truck frame while the hook 8 is substantially V-shaped to engage with the links of the chain 5. The portion 9 of this hook which forms a side of each of the hooks 7 and 8 is extended as shown to bear against the outer face of the frame and so assist the hook 7 in maintaining the hook 8 in vertical position. The bight portion of the hook 8 is provided with an extension 10 adapted by means of the aperture 11 formed therein to receive the terminal link of the chain 6 the other end of which is connected to the free end of the heavy chain 5.

The hook which as a whole has been designated by the numeral 3 consists of an eye-member 12 adapted to receive the terminal link of the chain 5 and provided with a lateral extension 13 which forms the hook proper and which as shown, extends at substantially right angles from the eye and is shaped to correspond with the contour of the wheel tread and flange in such a manner that when applied to the wheel the point of the hook bears against the outer face of the flange and the eye bears against the outer face of the wheel while the bight portion bears against the tread thereof. The inner or bearing face of this hook is beveled to form an edge 14 by means of which it is adapted to engage with the tread of the wheel and maintain its position thereon.

In operation the hook 1 is positioned upon the frame at a point adjacent the inner side of the bearing box, the hook 3 is engaged with the lower portion of the wheel tread and the chain 5 is passed around the journal box and engaged with the hook 1 by means of inserting one of its links between the sides of the V-shaped hook 8. It will be seen that if the car is moved to revolve the wheel the engagement of the wheel by the hook 3 will draw upon the chain to raise the journal box with respect to the axle of the wheel. The relatively light chain 6 is employed merely as a means for connecting the train engaging hook to the rest of the tool and thereby prevent the parts from becoming separated.

It will of course be understood that the hooks may be made in suitable sizes and shape to adapt them for use upon specially constructed truck frames and wheel treads, without in the slightest degree departing from the spirit of my invention.

What I claim is:—

1. A device of the character described, comprising a compound hook having two integrally formed oppositely disposed hooks lying in the same plane, one of said hooks being U-shaped to engage with the side frame of a car truck and the other of said hooks being V-shaped to receive the link of a chain, the side common to both of said hooks being extended to bear against the outer face of said frame, the bight portion of said V-shaped hook being extended and provided with an aperture adapted for connection with a light chain, a heavy chain connected to the free end of said light chain, and a hook connected to the free end of said heavy chain and adapted to engage with tread portion of a car wheel.

2. A device of the character described, comprising a hook the bight portion of which conforms with the tread of a car wheel and is beveled to form an edge to engage with the same, said bight portion terminating at its free end in an eye which extends at right angles therefrom and is adapted to bear against the outer face of the wheel, a chain connected by one end to said eye, a second hook adapted to engage with the side frame of the car truck, and means carried by said second hook for adjustable engagement with said chain.

In testimony whereof, I affix my signature, in presence of two witnesses.

ALVA A. NELSON.

Witnesses:
C. H. WOOD,
J. LORIMER.

Copies of this patent may be obtained for five cents each, by addressing the "Commissioner of Patents, Washington, D. C."